United States Patent [19]
Saito et al.

[11] Patent Number: 6,034,492
[45] Date of Patent: Mar. 7, 2000

[54] MOTOR-GENERATOR

[75] Inventors: Takashi Saito; Yukari Kibi, both of Tokyo, Japan

[73] Assignee: NEC Corporation, Japan

[21] Appl. No.: 09/067,621

[22] Filed: Apr. 28, 1998

[30] Foreign Application Priority Data

Apr. 30, 1997 [JP] Japan ................................ 9-112699
Jun. 19, 1997 [JP] Japan ................................ 9-162757

[51] Int. Cl.$^7$ .................................................. H02P 3/00
[52] U.S. Cl. ..................... 318/141; 318/139; 318/376; 318/145; 318/151; 320/15; 290/1 R; 290/1 C; 310/75 B
[58] Field of Search ........................ 318/139–150, 318/376, 430, 801; 290/38 R, 1 R, 50, 1 E, 1 C; 307/125, 43, 64, 85; 310/75 B, 68 R, 254, 268; 320/122, 167, 14, 56, 15, 61, 1; 123/179.1, 179.3, 192.1; 323/282; 180/65.2, 65.4

[56] References Cited

U.S. PATENT DOCUMENTS

| | | | |
|---|---|---|---|
| 3,240,947 | 3/1966 | Mas | 290/50 |
| 3,818,467 | 6/1974 | Willis | 340/224 |
| 4,227,092 | 10/1980 | Campagnuolo et al. | 290/1 C |
| 4,360,860 | 11/1982 | Johnson et al. | 362/192 |
| 4,637,274 | 1/1987 | Goldenfeld | 74/625 |
| 4,746,806 | 5/1988 | Campagnuolo et al. | 290/1 R |
| 4,785,435 | 11/1988 | Inoue et al. | 368/205 |
| 5,038,566 | 8/1991 | Hara | 60/608 |
| 5,105,776 | 4/1992 | Tsuchiya et al. | 123/192.1 |
| 5,256,956 | 10/1993 | Tsuchiya et al. | 320/15 |
| 5,412,293 | 5/1995 | Minezawa et al. | 318/376 |
| 5,513,718 | 5/1996 | Suzuki et al. | 180/65.2 |
| 5,532,572 | 7/1996 | Okamura | 320/1 |
| 5,552,681 | 9/1996 | Suzuki et al. | 318/139 |
| 5,604,426 | 2/1997 | Okamura et al. | 323/282 |
| 5,642,696 | 7/1997 | Matsui | 123/179.1 |
| 5,783,928 | 7/1998 | Okamura | 320/122 |
| 5,786,645 | 7/1998 | Obidniak | 310/68 R |
| 5,850,113 | 12/1998 | Weimer et al. | 307/125 |
| 5,910,714 | 6/1999 | Buchanan et al. | 318/139 |

FOREIGN PATENT DOCUMENTS

| | | | |
|---|---|---|---|
| 58-156235 | 9/1983 | Japan | H04B 1/40 |
| 62-171422 | 7/1987 | Japan | H02J 15/00 |
| 63-89026 | 4/1988 | Japan | H02J 7/00 |
| 1140221 | 1/1989 | Japan | G06F 3/12 |
| 336944 | 2/1991 | Japan | H02K 7/18 |
| 3106840 | 5/1991 | Japan | H02J 1/02 |
| 3101132 | 10/1991 | Japan | H02J 1/00 |
| 7-1 63014 | 6/1995 | Japan . | |
| 7296787 | 11/1995 | Japan | H01M 2/10 |
| 8101284 | 4/1996 | Japan | G04C 10/00 |
| 8149755 | 6/1996 | Japan | H02K 7/18 |
| 8163785 | 6/1996 | Japan | H02J 7/00 |
| 3036051 | 1/1997 | Japan | H04B 1/16 |
| 9257961 | 10/1997 | Japan | G04C 10/00 |
| 9303249 | 11/1997 | Japan | F03G 5/00 |
| 9330742 | 12/1997 | Japan | H01M 10/46 |

*Primary Examiner*—Paul Ip
*Attorney, Agent, or Firm*—Hayes, Soloway, Hennessey, Grossman & Hage, P.C.

[57] ABSTRACT

A D.C. motor-generator and an electric double layer capacitor are fixedly connected directly to each other and a rotary shaft of the motor-generator is rotated in one direction by an external force to generate D.C. electric energy which is stored in the electric double layer capacitor. By supplying the electric energy from the electric double layer capacitor to the D.C. motor-generator, the stored electric energy can be discharged as mechanical rotation energy. By deriving the stored energy as electric energy, an emergency power source can be provided.

8 Claims, 10 Drawing Sheets

MOTOR-GENERATOR

BACKGROUND OF THE INVENTION

1. Field of the Invention

The present invention relates to an applied technology of a large capacity double layer capacitor.

2. Description of Related Art

The inventors of this application have developed electric double layer capacitors capable of storing a large amount of electric energy. The electric double layer capacitor realizes a large electrostatic capacitance by forming an electric double layer using electrodes formed of solid activated carbon to substantially increase an equivalent area of the electrodes. A series resistance component of the electric double layer capacitor can be substantially reduced by suitably selecting electrolyte. A structure, an operational principle and a manufacturing method thereof are disclosed in, for example, Japanese Patent Publication No. Hei 7-91449, Japanese Patent Application Laid open No. Hei 7-201677, Saito et al. "Development of High Double Layer Capacitors", NEC Technical Report Vol. 47, No. 10 (October, 1994), pp 91~96 and Saito et al. "High-Power Electric Double Layer Capacitor Using Block-Form Activated Carbon Electrode", Monthly New Ceramics, Vol. 9, No. 12 (December, 1996), pp 21–25. The inventors of this application have fabricated an electric double layer capacitor of 15V, 470F having an equivalent series resistance of 4 mΩ and a maximum discharge current of 600 A and reported already. This electric double layer capacitor can store an electric power of about 15 Wh when charged to a maximum terminal voltage.

SUMMARY OF THE INVENTION

The present invention utilizes such high power electric double layer capacitor and an object of the present invention is to provide a motor-generator having a rotary shaft which is rotated by an external mechanical rotation force and can continue to rotate after the application of the external mechanical rotation force is stopped. Another object of the present invention is to provide a power supply suitable for use as an emergency power supply when a commercial power source is inoperable.

A first aspect of the present invention is the motor-generator featured by comprising a D.C. (direct current) motor-generator which becomes a D.C. generator for generating a D.C. current between a pair of terminals when a rotary shaft thereof is rotated in one direction by an external force and becomes a motor for rotating the rotary shaft when a D.C. current reverse in direction to the D.C. current to be generated by the D.C. generator is supplied to the pair of terminals and an electric double layer capacitor for storing the D.C. current generated by the D.C. motor-generator when the latter is operating as the generator and supplying the D.C. current to the D.C. motor-generator when the latter is operating as the motor, a pair of terminals of the electric double layer capacitor being fixedly connected directly to the pair of the terminals of the D.C. motor-generator by a pair of conductors, respectively.

When means (for example, a handle) for transmitting an external force to the rotary shaft of the D.C. motor-generator is provided to rotate the rotary shaft in one direction, the D.C. motor-generator operates as a generator and D.C. current is generated at the pair of terminals. Since the terminals of the D.C. motor-generator are fixedly connected directly to the respective terminals of the electric double layer capacitor by the respective conductors, the D.C. current generated thereby is stored in the electric double layer capacitor as D.C. electric energy.

When a rotation force is applied externally to the D.C. motor generator for a certain time period (for example, several tens seconds) and then the application of the external force is stopped (for example, by removing a hand from the handle), the D.C. electric energy stored in the electric double layer capacitor is supplied to the pair of the terminals of the D.C. motor-generator as a D.C. current in an opposite direction to the direction during the charging to rotate the D.C. motor generator as a motor in the same direction as the direction of the external force. Rotation speed in the later case is slightly lower than the case of charging.

By providing mechanical means such as a rachet gear or a chain gear which allows the rotary shaft of the D.C. motor-generator to rotate in only one direction on the rotary shaft, it is possible to externally transmit a driving force generated by the D.C. motor-generator as the motor to make it possible to be used as an auxiliary power source for an electric vehicle or a hybrid vehicle.

When the D.C. motor-generator is driven as the generator by applying a rotation force thereto, unexpected damage caused by over-voltage can be preliminarily prevented by connecting a voltage limiter circuit between the terminals thereof such that the terminal voltage applied to the electric double layer capacitor does not exceed a predetermined value.

As an example of a device for keeping a rotation of a rotary shaft of a rotary machine when an application of external mechanical rotation force is stopped after the external force is applied thereto, that is, a power assist device, Japanese Patent Application Laid-open No. Sho 59-213228 discloses a power source device which includes a generator capable of being rotated by man power and a large capacity electrolyte capacitor and in which electric energy generated by the generator is stored in the capacitor. In an electric vehicle, a technique in which a battery and an electric motor are mounted thereon and, in a driving phase, the vehicle is moved by driving the motor with a current derived from the battery and, in a braking phase, the motor is temporarily operated as a generator and electric energy generated by the temporary generator is stored in the battery is well known. In an electric bicycle, a technique in which the electric bicycle is equipped with a battery and an auxiliary motor, is driven by man power as a bicycle on a flat ground and the man power is reduced on such as a uphill requiring large man power by temporally connecting the battery to the auxiliary motor is well known.

In these prior art devices, however, in order to store electric energy in a battery or an capacitor and utilize the stored electric energy as a power source, a complex control circuit and/or a large size converter are required. In, for example, an electric vehicle, it is necessary to provide a control circuit for regulating current between a battery and a motor when the vehicle is driven by connecting the battery having a terminal voltage is a standard value E which is, for example, about 160V to the electric motor. Further, when the motor is operated as a generator in the braking phase and electric energy generated by the motor operating as the generator is stored in the battery, an inverter circuit for making an output of the motor as the generator higher than the standard terminal voltage, for example, making it Ex1.5, is required. In such case, in order to effectively store the electric energy correspondingly to a variation of rotation speed during the braking phase, the inverter circuit requires a control circuit for controlling the voltage/current correspondingly to a varying speed and a time.

Such inverter circuit and the control circuit are large sized heavy hardware, the vehicle requires a space large enough to mount such devices therein and a mechanical structure of the vehicle must be rigid enough. Sensors for detecting voltage and speed are also required. Further, since such inverter circuit and the control circuit have energy loss and, even if the circuits are optimally designed, energy which can be recovered is 50–70% of generated energy at most.

Further, since the number of charging/discharging cycles of a battery is limited and the battery life is relatively short, a maintenance thereof is necessary. In an electric bicycle having an auxiliary motor, the use of a device which recovers braking energy generated when the electric bicycle goes downhill while braking in a battery or an capacitor is not practical due to the size of the inverter and/or the control circuit.

A mechanical device utilizing a fly-wheel is known as a technique for storing energy. For example, in order to smooth intermittent energy generated by explosion in cylinders of an internal combustion engine, a fly-wheel is connected to a rotary shaft of the engine. Further, a three engine device is also known in which a large size fly-wheel is driven by an electric motor and, when a power source of the electric motor is cut unintentionally, an auxiliary internal combustion engine is started by a rotation energy stored in the fly-wheel.

In such device utilizing fly-wheel in which a rotary member of large mass rotates at high speed, however, safety thereof is importance problem, so that the device becomes rigid and heavy necessarily.

According to a first aspect of the present invention, energy generated by mechanical rotation can be stored as electric energy and the stored electric energy can be utilized again as mechanical rotation energy by directly connecting a D.C. motor-generator to an electric double layer capacitor through a pair of conductors. Further, since there is no need of providing any circuit between the D.C. motor generator and the electric double layer capacitor, it is possible to make a device structure simple and rigid and, therefore, it is possible to realize a reliable device of minimum trouble.

A second aspect of the present invention resides in a power source device suitable for use in a case where a commercial power source is cut unintentionally, which comprises a D.C. power source circuit for converting a D.C. current input to D.C. input terminals into a predetermined D.C. power source output and means for supplying D.C. current to the D.C. input terminals of the D.C. power source circuit, wherein the supplying means comprises a D.C. generator for generating a D.C. current and an electric double layer capacitor for temporarily storing the D.C. current generated by the D.C. generator and supplying it to the D.C. input terminals of the D.C. power source circuit, the D.C. generator and the electric double layer capacitor are connected in series with the D.C. input terminals of the D.C. power source circuit and a polarity inverter circuit for inverting the polarity of the electric double layer capacitor between a charging time and a discharging time is connected to the D.C. input terminals of the D.C. power source circuit.

This power source device can be utilized as, particularly, an emergency power source device of an optical fiber communication terminal. It is expected that, with the popularization of optical fiber communication system, the optical fiber communication terminal may be provided in individual home of general user in the near future. On the other hand, in the optical fiber communication system, the communication terminal is connected to a base station through only an optical fiber and no metal wire pair is connected therebetween basically. Therefore, it is impossible to supply a minimum necessary power source current by a D.C. communication current from the base station to the terminal unlike the conventional wired communication system. In general, in an optical fiber communication system, a high performance electronic device for processing a high speed digital communication signal is provided in a communication terminal and a power source circuit for providing a power source current necessary to operate the electronic device from a commercial power source (in Japan, A.C. 100V, 60 or 50 Hz) is provided. In such device, there may be a case where a communication becomes impossible through a normal communication line, due to unintentional cut of commercial power source in such a case of disaster. In order to accommodate to such case, a battery or a generator has been provided as an auxiliary power source of the communication terminal.

However, a dry-cell which is compact as a battery power source degrades with time even if it is not used. Therefore, periodical maintenance thereof such as exchange of dry-cell is necessary and, without such maintenance, the auxiliary battery power source becomes useless in an emergency case. A power source using a large size lead battery requires a specific space therefor and the maintenance and use thereof requires special techniques. A generator as the auxiliary power source has a large size internal combustion engine and requires troublesome works such as long term periodic maintenance including exchange of battery. A simple man power generator for communication has been employed for a military use. However, a use thereof by a general user is not suitable since it must be operated for a whole communication time period.

According to the second aspect of the present invention, the electric double layer capacitor is used as the emergency power source of a communication device. The electric double layer capacitor is featured by compactness in size, very large electrostatic capacitance and very small internal resistance. Therefore, it is possible to continue communication by using electric energy stored in the electric double layer capacitor even after the driving of the generator is stopped, by operating the generator for a short time by man power and storing electric energy obtained thereby in the electric double layer capacitor.

The direction of current in charging the electric double layer capacitor is opposite to that in discharging. Therefore, a circuit for connecting the polarity inverter circuit for inverting the polarity of the electric double layer capacitor is necessary. The polarity inverter circuit may be a double pole double throw switch or a semiconductor rectifier circuit.

The D.C. generator utilized in the second aspect of the present invention may be a D.C. motor-generator whose direction of current when it is operated as a motor is opposite to that when it is operated as a generator and whose rotary shaft rotates unidirectionally regardless of the operating state thereof. That is, the D.C. generator of this type or D.C. motor-generator has a simple structure and does not require another power source for generating a field current.

The D.C. motor-generator having this structure generates a D.C. current at terminals (two terminals) when its rotary shaft is driven by external force and generates mechanical rotation force in the rotary shaft when current is supplied to the terminals externally, that is, when it operates as a motor. In this case, when the rotation of the rotary shaft is mechanically stopped forcibly, the terminals are electrically short-circuited. Therefore, when the D.C. generator having two terminals, the electric double layer capacitor having two terminals and D.C. input terminals of the D.C. power source as a load are connected in series, the D.C. generator is short-circuited by locking the rotary shaft thereof and the electric double layer capacitor having two terminals and the two D.C. input terminals are electrically connected directly. In such state, charge stored in the electric double layer capacitor is supplied to the D.C. input terminals of the D.C. power source circuit.

The mechanical means for forcibly stopping the rotation of the rotary shaft may be a driving handle of a generator, a pedal or other means such as a fixing pin for locking the rotation of a rotary mechanism.

Further, when a constant voltage circuit such as a Zener diode is connected to the D.C. input terminals of the D.C. power source circuit and an over current exceeding a current necessary for the D.C. power source is generated by the D.C. generator, it by-passes the constant voltage circuit and is stored in the electric double layer capacitor.

When a constant current circuit is connected to the D.C. input terminals of the D.C. power source circuit and electric energy stored in the electric double layer capacitor is discharged, it is possible to avoid a supply of over current to the D.C. power source circuit in an initial stage in which stored charge is large.

The electric double layer capacitor may be connected in parallel to the D.C. input terminals of the D.C. power source circuit. That is, according to a third aspect of the present invention, a power source device is provided which comprises a D.C. power source circuit for converting a D.C. current input to the D.C. input terminals into a predetermined D.C. power source output and means for supplying a D.C. current to the D.C. input terminals of the D.C. power source circuit, wherein the supplying means comprises a D.C. generator for generating a D.C. current and an electric double layer capacitor for temporarily storing the D.C. current generated by the D.C. generator and supplying it to the D.C. input terminals, the D.C. generator and the electric double layer capacitor being connected in parallel to the D.C. input terminals of the D.C. power source circuit.

In this construction of the power source device, it is preferable to connect a constant current circuit to the D.C. input terminals of the D.C. power source circuit. In the latter case, it is possible to avoid supply of over current to the D.C. power source circuit in an initial state in which stored charge is large when electric energy stored in the electric double layer capacitor is discharged.

BRIEF DESCRIPTION OF THE DRAWINGS

Embodiments of the present invention will be described with reference to the accompanying drawings, in which:

FIGS. 6a and 6b show a result of experiment, in which FIG. 6a shows a variation of current in a charging and discharging period and FIG. 6b shows a variation of voltage in a charging and discharging period;

DETAILED DESCRIPTION OF PREFERRED EMBODIMENTS

Figure 1:
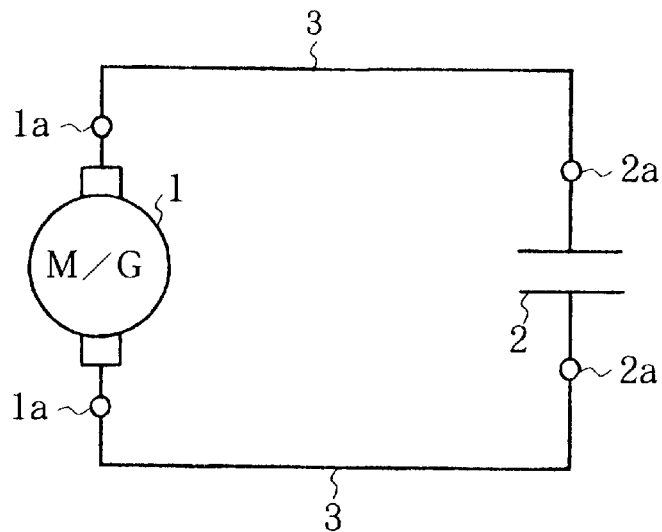
FIG. 1 shows a basic electric circuit construction of a first embodiment of the present invention.
Figure 2:
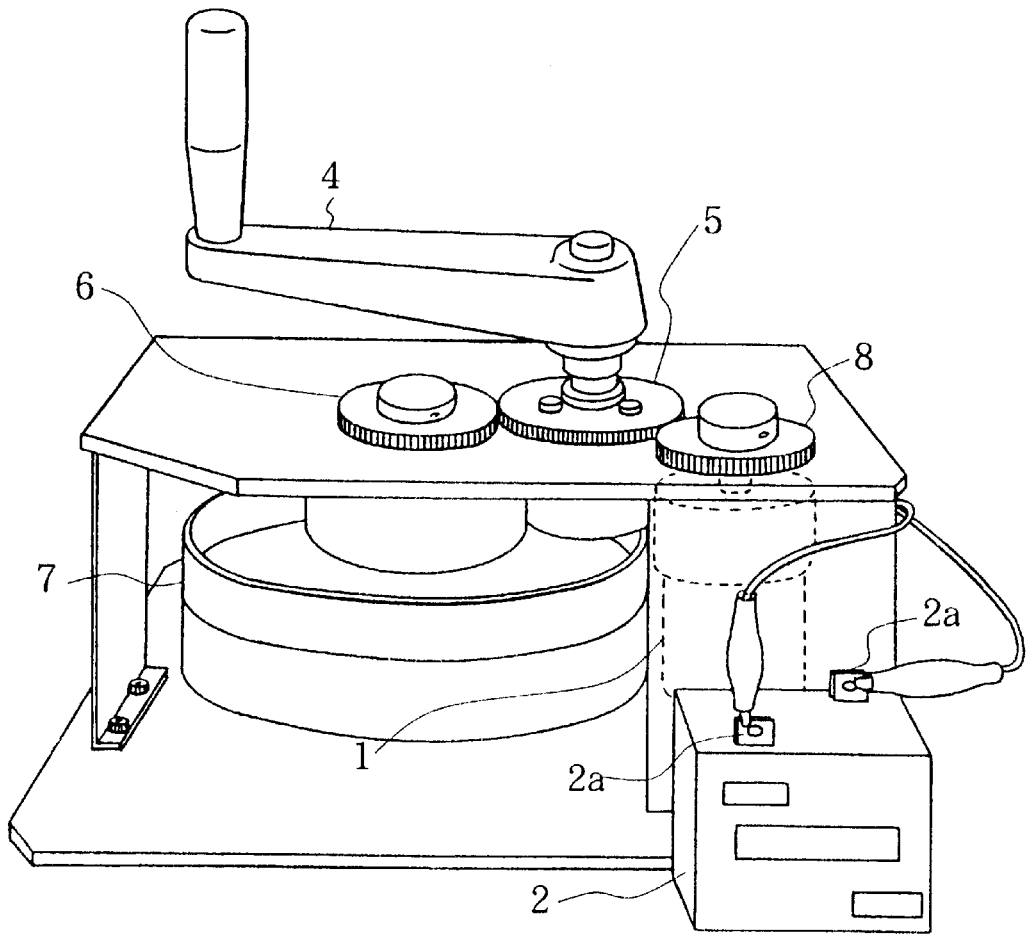
FIG. 2 is a perspective view of an example of a mechanical device for transmitting an external force to a power source device of the present invention.
Figure 3:
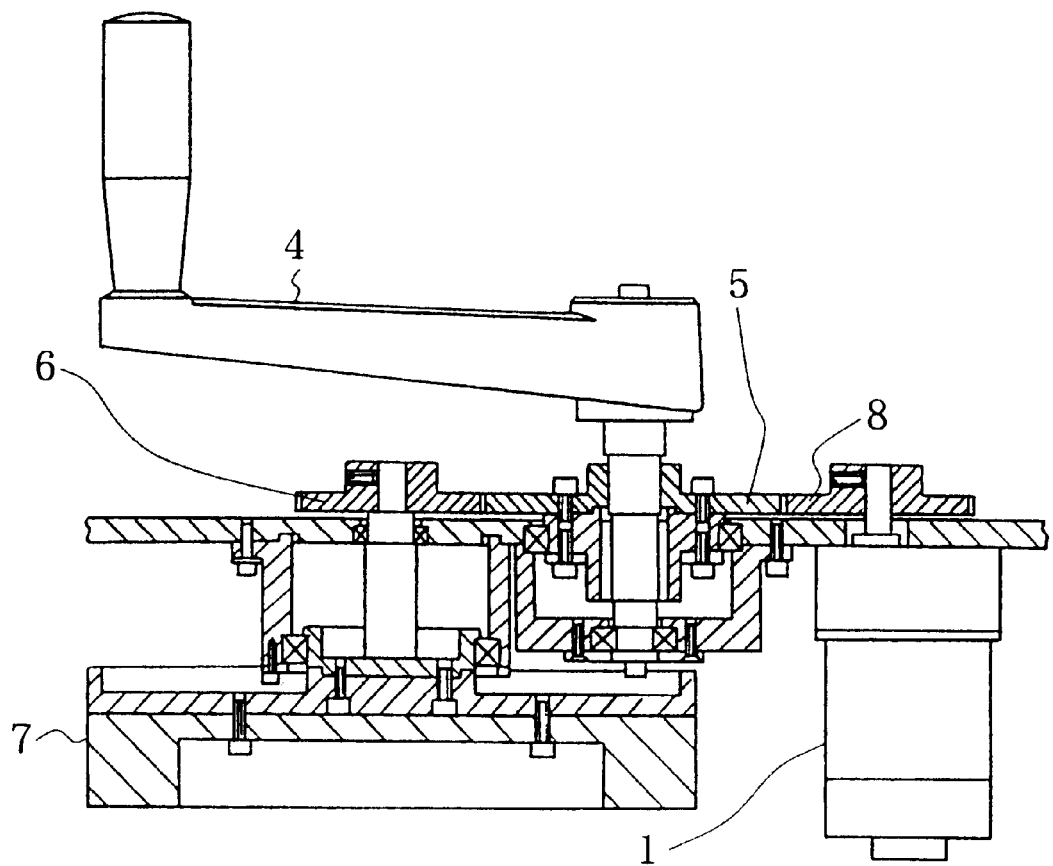
FIG. 3 is a partial cross sectioned side view showing the mechanical device shown in FIG. 1.
Figure 4:
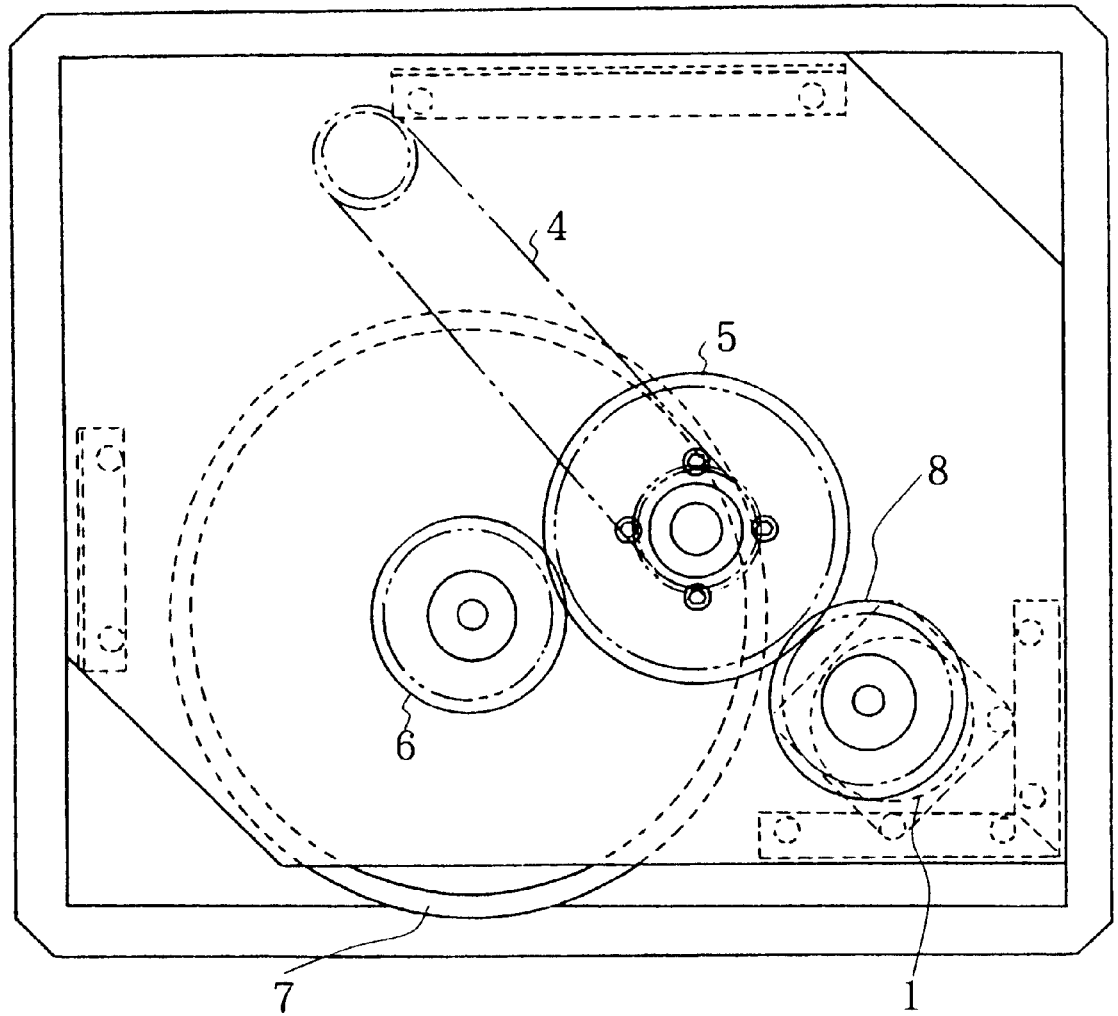
FIG. 4 is a plan view of the mechanical device shown in FIG. 1.

A first embodiment of the present invention will be described first. FIG. 1 shows a basic electric circuit construction of a first embodiment of a power source device of the present invention, FIG. 2 is a perspective view of an example of a mechanical device for transmitting an external force to the power source device of the present invention, FIG. 3 is a partial cross sectioned side view showing the mechanical device of the power source device, shown in FIG. 1 and FIG. 4 is a plan view of the mechanical device shown in FIG. 1. An electric part of the power source device includes basically a D.C. motor-generator 1 which becomes a generator for generating a D.C. current at a pair of terminals 1a thereof when a rotary shaft thereof is rotated in one direction by an external force and becomes an electric motor for rotating the rotary shaft in the same direction as the rotating direction of the motor-generator as the generator when a D.C. current in an opposite direction to that of the current generated in the terminals 1a is supplied thereto and an electric double layer capacitor 2 for storing D.C. electric energy generated by the D.C. motor-generator 1 and supplying the stored energy back to the D.C. motor-generator 1. The pair of the terminals 1a of the D.C. motor-generator 1 and a pair of terminals 2a of the electric double layer capacitor 1 are fixedly connected to each other by a pair of conductors 3, respectively.

A mechanical part of the power source device of the present invention includes a handle 4, a handle gear 5 detachably mounted on the handle coaxially with a rotation center of the handle, a fly-wheel gear 6 meshed with the handle gear 5 so that a rotation of the handle gear is transmitted thereto, a fly-wheel 7 fixed coaxially with the fly-wheel gear 6 and a drive gear 8 meshed with the handle gear 5 fixed on the rotary shaft of the D.C. motor 1, as shown in FIGS. 2, 3 and 4. When the fly-wheel 7 is unnecessary, it can be detached.

As mentioned previously, the electric double layer capacitor 2 was fabricated and reported. A capacitor of this type is constructed with a conductor (electrodes) and electrolyte to polarize ions in an interface thereof to thereby store charge. In order to obtain a large capacity, activated carbon powder or activated carbon fiber which has a large surface area and electrically conductive is used for the electrodes. Since, in the electric double layer capacitor, only ions move and dissolution and precipitation of substance do not occur unlike a battery, degradation of electrode is small, so that a high reliability can be obtained and a long term maintenance is not required.

An operation of this embodiment will be described.

When the handle 4 is rotated in one direction manually, the handle gear 5 is rotated and hence the drive gear 8 meshed with the handle gear 5 is rotated. Since the drive gear 8 is fixedly secured to the rotary shaft of the D.C.

motor-generator 1, a rotor of the D.C. motor-generator 1 is driven by the rotation of the drive gear 8, so that the D.C. motor generator 1 is operated as a generator and D.C. electric energy is generated. The thus generated D.C. electric energy is supplied through the conductors 3 to the electric double layer capacitor 2 and stored therein.

On the other hand, since the handle gear 5 meshes with the fly wheel gear 6, the fly-wheel 7 fixedly secured to the rotary shaft of the fly-wheel gear 6 is rotated to smooth a variation of rotation in the D.C. motor-generator 1.

When an operator lets his hand off from the handle 4 to stop the rotation of the D.C. motor-generator 1 in a state in which a predetermined amount of D.C. electric energy is stored in the electric double layer capacitor 2, the D.C. electric energy stored in the electric double layer capacitor 2 is supplied through the conductors 3 to the D.C. motor-generator 1 to drive the latter as a motor. In this case, although the current flows through the motor-generator 1 in opposite direction to that during the motor-generator is working as the generator, the rotating direction of the rotary shaft thereof is made the same as that when the motor-generator is working as the generator. This can be achieved by series connecting the field winding to an armature winding, that is, a brush terminal, of the motor-generator.

By providing a mechanism such as a rachet gear or a chain gear for allowing only one directional rotation on the rotary shaft of the handle gear 5 on which the handle 4 is mounted, it is possible to transmit the driving force of the D.C. motor-generator 1 externally. This mechanism can be applied to, for example, an electric car, a hybrid vehicle and an electric bicycle.

Figure 5:
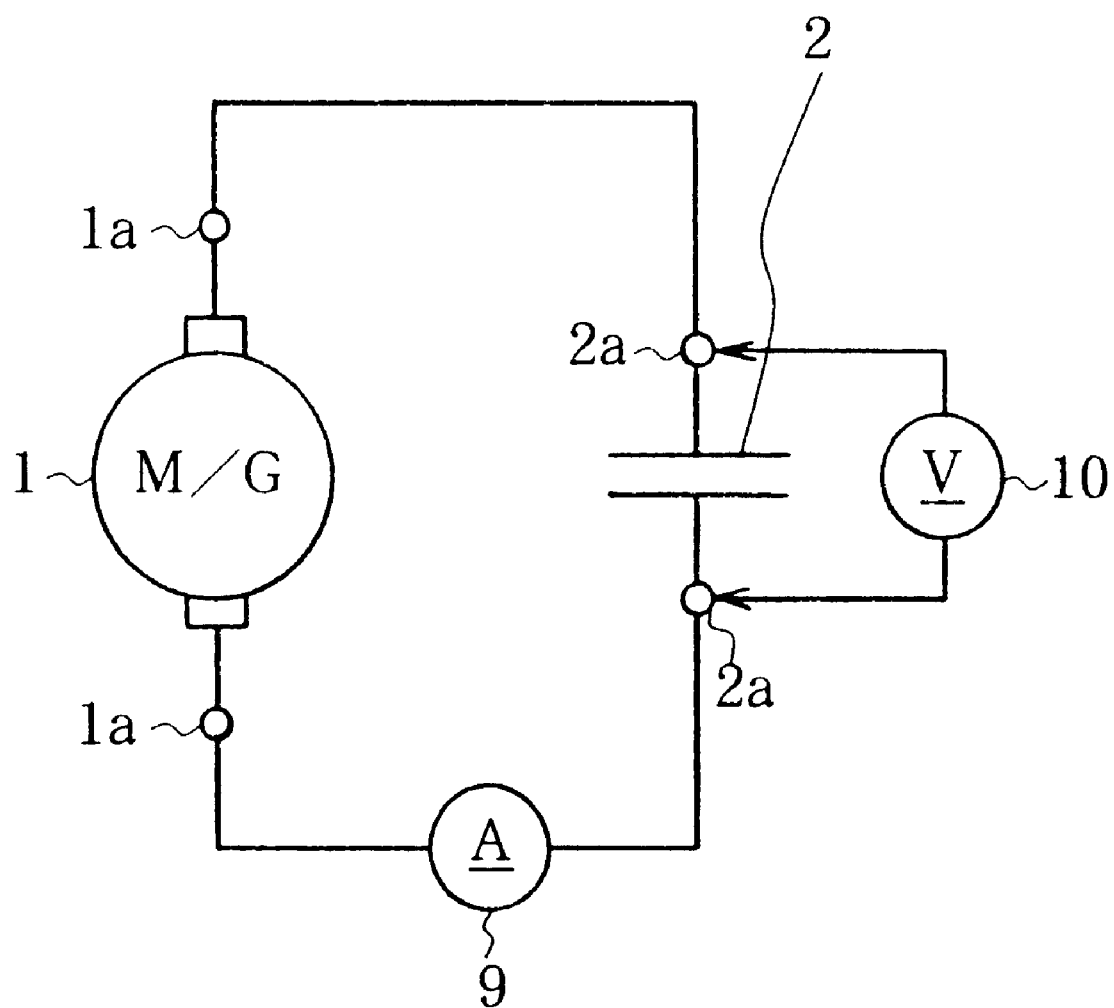
FIG. 5 shows a circuit construction for an experimental purpose.
Figure 6:
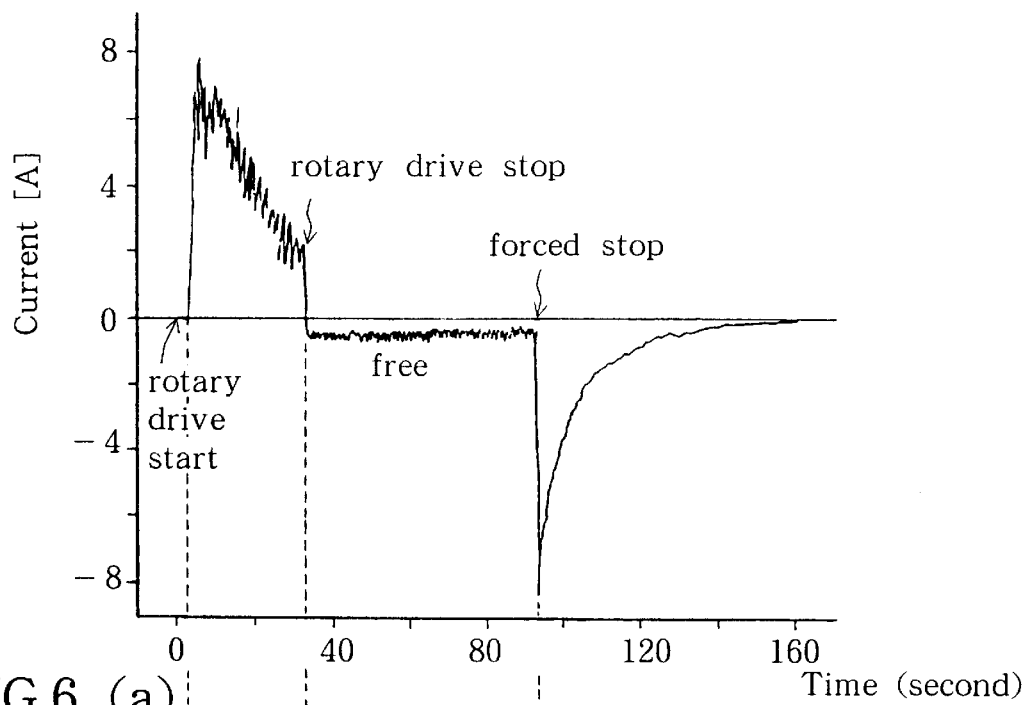
Figure 6:
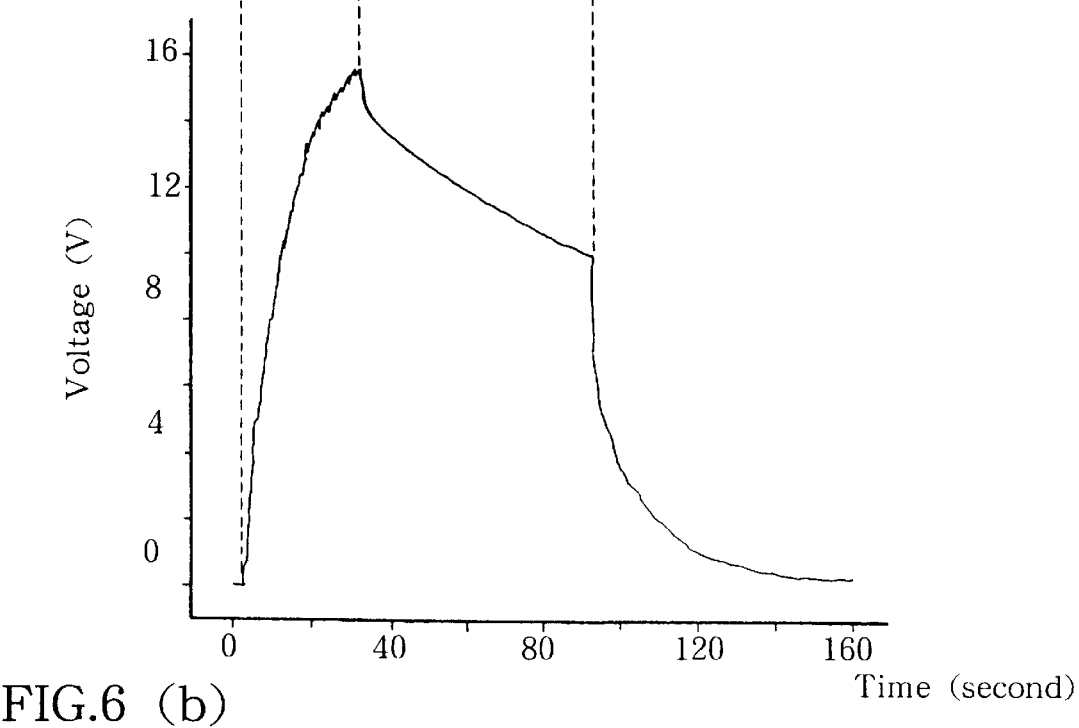

In the above mentioned construction of the power source device, the current value and the voltage value in the charging time and the discharging time were measured by driving the D.C. motor-generator 1 manually. The electric double layer capacitor 2 used in this measurement had volume of about 300 cc, weight of about 500 g, electrostatic capacitance of 15F, maximum terminal voltage of 15V, equivalent series resistance of 70 mΩ and maximum storage energy of 0.5 Wh. FIG. 5 shows a circuit used in this measurement. The measurement was performed by using the D.C. motor-generator 1 having a rated voltage of D.C. 12V without any load resistor connected thereto, under assumption that a series resistor of a current meter 9 is substantially zero and a series resistance of a voltage meter 10 is substantially infinite. FIGS. 6a and 6b show a variation of the measured charging and discharging current and a variation of the measured charging and discharging voltage on the same time axis, respectively.

When the handle 4 is manually rotated in a predetermined direction, the driving force is transmitted from the handle gear 5 directly connected to the handle 4 to the drive gear 8 to rotate the D.C. motor generator 1 and the drive force is also transmitted to the fly-wheel gear 6 to rotate the fly-wheel 7.

When the D.C. motor-generator 1 starts to rotate after this rotational driving, the motor-generator 1 is driven as the generator and the value of current generated thereby increases quickly to about 8 A as shown in FIG. 6a. The electric double layer capacitor 2 is gradually charged and the terminal voltage thereof increased gradually, as shown i FIG. 6b. When the rotational driving of the D.C. motor-generator 1 is continued, the current value and the voltage value reduces and increases as shown in FIGS. 6a and 6b, respectively, with increase of charge in the electric double layer capacitance 2. That is, the D.C. electric energy generated by the D.C. motor-generator 1 working as the generator is stored in the electric double layer capacitor 2.

When the manual driving of the handle 4 is stopped at a time instance after about 30 seconds from the start of the driving by letting the hand of the user off from the handle 4, the D.C. motor-generator 1 is switched from the generator to the motor and its rotation speed is slightly reduced. That is, the D.C. electric energy stored in the electric double layer capacitor 2 is supplied to the D.C. motor-generator 1 to drive the latter as the motor. Since there is substantially no load, the current value is maintained at about 0.5 A and the voltage value is reduced gradually from about 15.5V with loss of energy.

The rotational driving of the D.C. motor-generator 1 was stopped forcibly at a time instant after about 60 seconds from the stoppage of the manual driving of the handle 4 and the voltage value was lowered to about 10V. With this stoppage of the driving of the D.C. motor-generator 1, the latter became in a short-circuited state, so that a large current (about 8 A) was discharged at once and D.C. electric energy stored in the electric double layer capacitor 2 was discharged completely within about 60 seconds after the forced stoppage of the D.C. motor-generator 1.

It is clear from this experiment that, when the D.C. motor-generator 1 is rotated by external force, it generates D.C. current and the electric double layer capacitor 2 is charged thereby and, when the external force is stopped, D.C. current is supplied from the electric double layer capacitor 2 to the D.C. motor-generator 1 to drive the latter as the motor.

Figure 7:
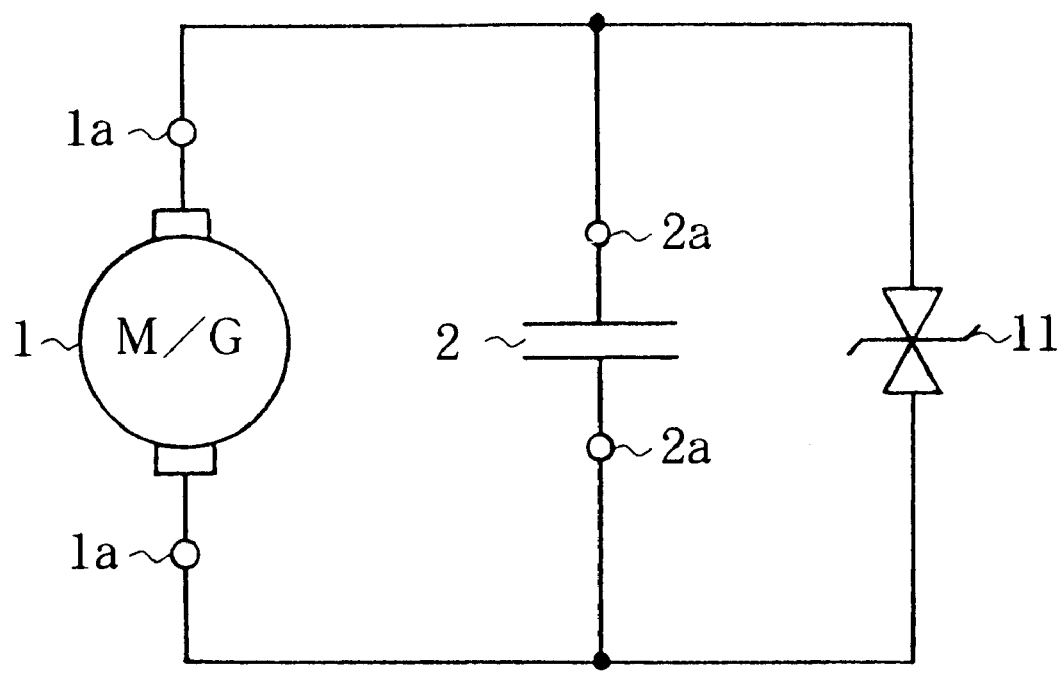
FIG. 7 shows an electric circuit construction according to a second embodiment of the present invention.

FIG. 7 shows an electric circuit of a second embodiment of the present invention. This embodiment differs from the first embodiment in that a voltage limiter circuit 11 is connected between the terminals 1a of the D.C. motor-generator 1 and the terminals 2a of the electric double layer capacitor 2. In this power source device according to the second embodiment, the value of the D.C. voltage generated by the D.C. motor-generator 1 is limited such that it does not exceed a predetermined value, so that it is possible to prevent the power source device from being damaged by over voltage. When the terminal voltage of the electric double layer capacitor 2 is risen and the voltage limiter circuit 11 is turned on, the handle 4 becomes heavy immediately. When the terminal voltage is lower than the limit voltage of the voltage limiter circuit 11, the charging of the electric double layer capacitor 2 from the D.C. motor-generator 1 and the feeding from the electric double layer capacitor 2 to the D.C. motor-generator 1 are performed in the same manner as that of the first embodiment.

Figure 8:
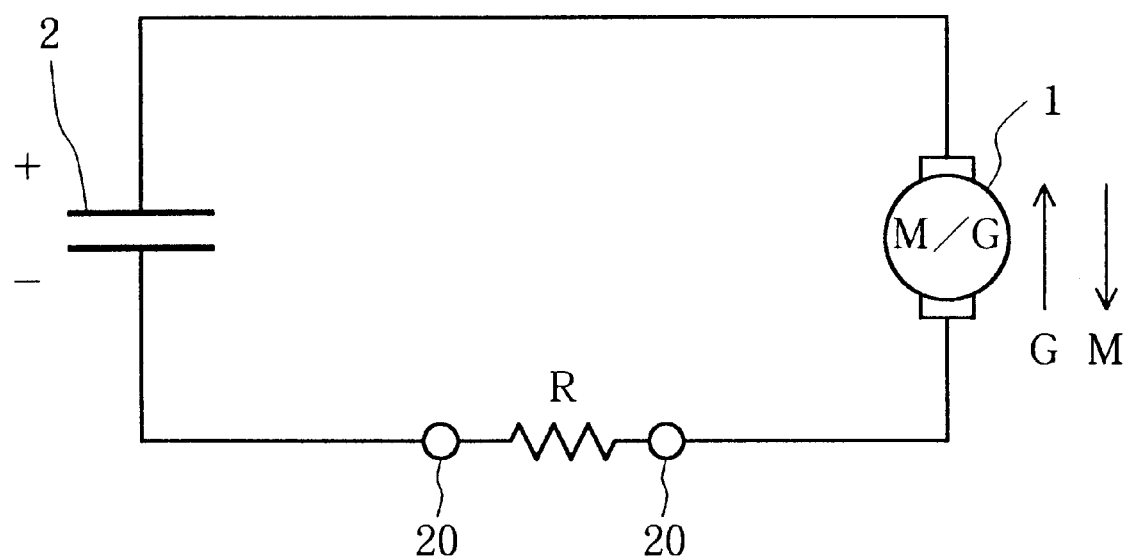
FIG. 8 shows a basic electric circuit construction according to a third embodiment of the present invention.

FIG. 8 shows a basic circuit construction of a third embodiment which is a power source device suitable for use as an emergency power source when a commercial power source is cut unintentionally. According to this embodiment, a D.C. motor-generator 1, an electric double layer capacitor 2 and D.C. input terminals 20 of a D.C. power source circuit are connected in series. The direction of current when the D.C. motor generator 1 operates as a motor is shown by an arrow M and that when it works as a generator by an arrow G which is opposite to the arrow M. However, the rotational direction of the rotary shaft of the D.C. motor generator 1 is one and same direction regardless of the working state of the motor-generator 1. In the construction shown in FIG. 8, the motor-generator 1 is operated as a generator by driving a rotary shaft thereof to supply current to a load R of the power source circuit to thereby charge the electric double layer capacitor 2. The direction of current i this case is shown by the arrow G. The polarity (+,−) of the electric double layer capacitor 2 is shown in FIG. 8. When the driving of the rotary shaft of the motor-generator 1 is stopped after the electric double layer capacitor 2 is charged suitably, discharge is started from the electric double layer capacitor 2 to the motor-generator 1, so that the latter is switched to a motor and the rotary shaft thereof is rotated by the current. The direction of current in this case is shown by the arrow M according to the polarity of the electric double layer capacitor 2. Therefore, current flowing through the load R of the power source circuit is inverted with respect to that in the case of the generator. Therefore, a polarity inverter circuit is necessary between the D.C. input terminals 20 of the power source circuit.

Further, in the construction shown in FIG. 8, when the motor generator 1 is operated as the motor after the electric double layer capacitor 2 is charged suitable and the rotary shaft of the motor generator 1 is forcibly locked mechanically during the discharging of current M, the motor-generator 1 becomes in a state where the load thereof becomes infinite, so that the resistance value between the terminals of the motor-generator 1 becomes substantially zero and the terminals are electrically short-circuited in appearance. In this state, charge stored in the electric double layer capacitor 2 flows as current through the load R. The mechanical locking of the rotary shaft of the motor-generator 1 may be achieved by means for preventing the handle mounted on the rotary shaft from rotating by using a protrusion, a pin, a hook or the like.

It is possible to rotate the motor-generator 1 by hand, foot pedal or simple internal combustion engine and it is possible to supply power source current for a long time by utilizing electric energy obtained by manually rotating the motor-generator for a suitable time period in an initial state of the use of the power source device and stored in the electric double layer capacitor, even if the power generation is stopped thereafter.

According to the experiments conducted by the inventors, it was proved that, when an experimental power source device is fabricated and is rotated by a hand for a certain time, an emergency power source device which can support a communication for a time 5 to 10 times the certain time is obtained. For example, it is possible to design a power source device capable of performing a communication by supplying power source current to an optical fiber terminal for about 10 minutes after the generation of electric energy is stopped after about 1 minute manual operation of the power source device as the generator.

The result of the experiments shown in FIGS. 6a and 6b will be described in detail. The motor-generator 1 is started to operate as the generator by rotating the handle thereof with a hand at a time instance "0" and, after about 30 seconds lapses from the start of operation, the manual handle operation is stopped to rotate the motor-generator 1 as the motor by letting the hand off from the handle. At a time instance after about 90 seconds lapses from the time instance at which the manual handle operation is stopped, the handle of the motor-generator 1 is forcibly locked by a pin so that the motor-generator 1 can not rotate. In this state, the terminals of the motor-generator 1 are short-circuited to each other and a large current flows in the direction of the arrow M as in FIG. 8. This current is caused by an abrupt discharge of charge stored in the electric double layer capacitor 2 and energy generated by this current is consumed by the internal resistance of the D.C. motor generator 1 and attenuated gradually and the terminal voltage of the electric double layer capacitor 2 is reduced gradually. At a time instance at which the discharge is completed, this current becomes zero and the terminal voltage is also becomes zero.

From the result of the experiments shown in FIG. 6a, it is clear that the current is changed from 6 A to 2 A during a time period of about 30 seconds from the time instance "0". representing this with a primary function, the current I becomes as follows:

$$I=(4/30)t+6$$

By integrating the current I from t=0 second to 30 seconds, a value of 240 C(Coulomb) is obtained. Assuming that the power source device can not be used when the minimum terminal voltage of the power source device, that is, the terminal voltage of the electric double layer capacitor 2, becomes lower than 5V, the charge of $$5(V)\times 8(F)=40(C)$$

is left in the electric double layer capacitor 2 as unusable charge. Therefore, charge of $$240-40=200(C)$$

can be utilized. Assuming that a constant power source current of 500 mA is to be supplied to the optical fiber terminal, it is clear that the power source device can supply the power source current for about 400 seconds. That is, when the motor-generator is operated manually as the generator for about 30 seconds, it is possible to supply the power source current for about 400 seconds (6 minutes 40 seconds) thereafter.

The required value of the power source current depends upon the terminal device used. Therefore, it is possible to realize an emergency power source device capable of performing a communication for about 10 minutes after a manual driving of the motor-generator thereof for about 1 minute, by connecting a plurality of electric double layer capacitors in parallel.

FIGS. 9 to 12 show practical constructions of the power source device.

Figure 9:
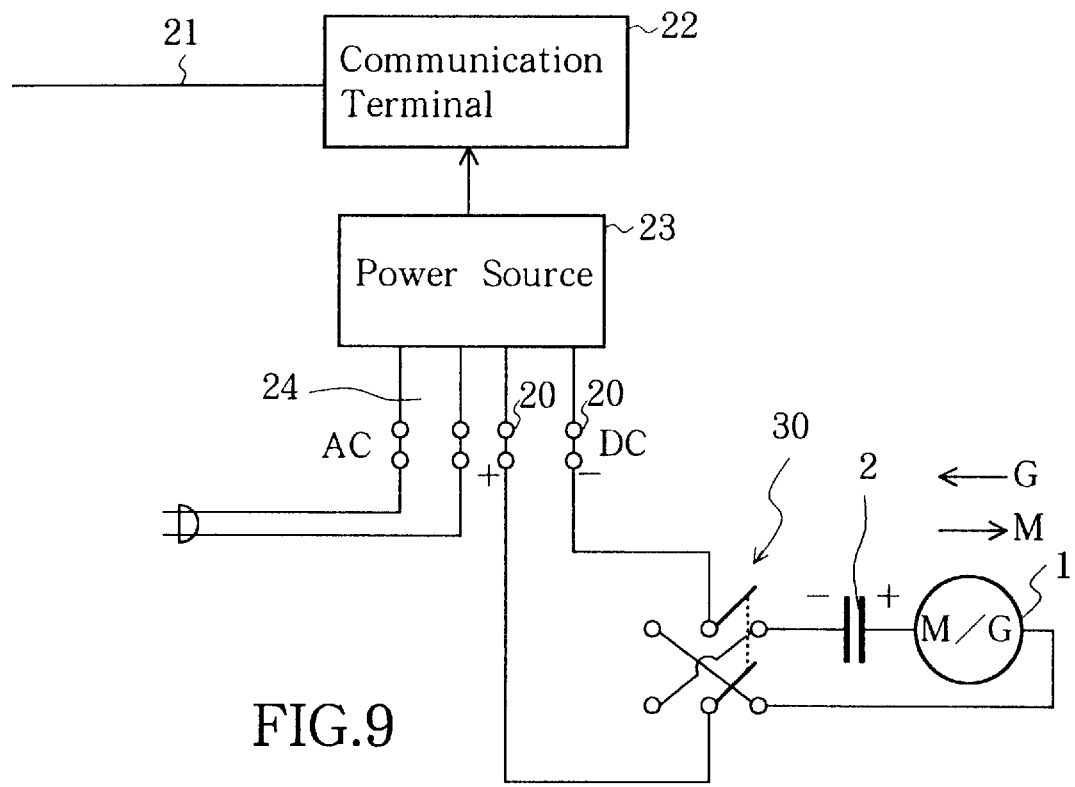
FIGS. 9 to 12 are block diagrams of practical examples of the circuit construction, respectively.

In the construction shown in FIG. 9, a power source circuit 23 for supplying a power source current is provided in a communication terminal 22 at which an optical fiber 21 is terminated. The communication terminal 22 includes an interface for connecting the optical fiber 21, a communication MODEM, a transmitter/receiver for transmitting/receiving a high speed digital communication signal, a computer device for storing and processing received digital data and transmitting digital data, an operation key board, etc. A commercial power source (A.C. 100V) is normally supplied to a terminal 24 of the power source circuit 23 and, in an emergency situation, that is, when the commercial power source can not be used for some reason, a current is supplied to the D.C. input terminals 20 from a circuit composed of the D.C. motor-generator 1 and the electric double layer capacitor 2. As a polarity inverter circuit for inverting the flowing direction of current between charging and discharging times of the electric double layer capacitor 2, a double pole double throw switch 30 is provided in the D.C. input terminal 20.

Describing an operation of the embodiment shown in FIG. 9, when the commercial power source becomes unusable, a D.C. current is supplied from the circuit composed of the D.C. motor-generator 1 and the electric double layer capacitor 2 to the terminals 20. In this case, the double pole double throw switch 30 is initially thrown to left side contacts in the figure and the motor-generator 1 is rotated manually. The current generated in the direction of the arrow G is supplied to the D.C. input terminals 20 while charging the electric double layer capacitor 2, so that the power source circuit 23 becomes ready to use. The power source current is supplied to the communication terminal 22 and the latter can continue a communication.

After the motor-generator 1 is rotated manually for, for example, 5 to 10 minutes, the double pole double throw switch 30 is thrown to the right side and the rotary shaft of the motor-generator 1 is mechanically locked. Thus, the motor-generator 1 becomes the motor and charge stored in the electric double layer capacitor 2 is discharged as a current flowing in the direction of the arrow M. Since the motor-generator 1 is the motor which can not be rotated, an impedance between the terminals thereof is substantially zero and the current from the electric double layer capacitor 2 is supplied to the D.C. input terminals 20 of the power source circuit 23 to operate the latter. Current generated by the power source circuit 23 is supplied to the communication terminal 22.

Figure 10:
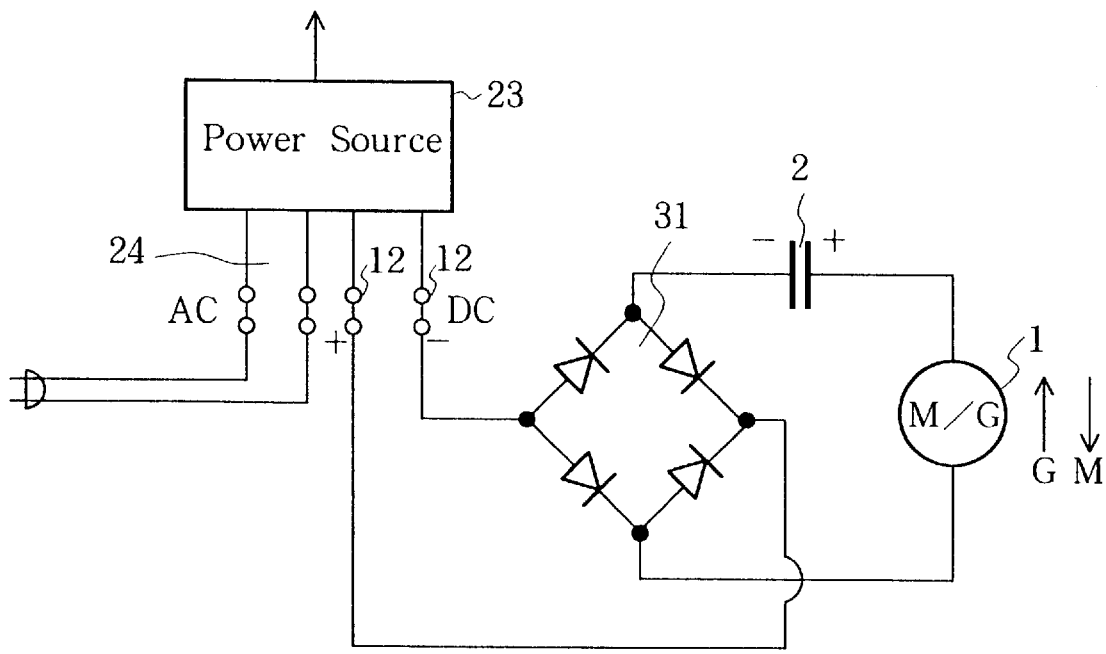

The embodiment shown in FIG. 10 utilizes a rectifier circuit 31 composed of diodes as the polarity inverter circuit. By the rectifier circuit 31, current in a constant direction is supplied to the D.C. input terminals 20 when the motor-generator 1 operates as the generator and current flows in the arrow G direction as well as when the motor generator 1 operates as the motor and current flows in the arrow M direction.

Figure 11:
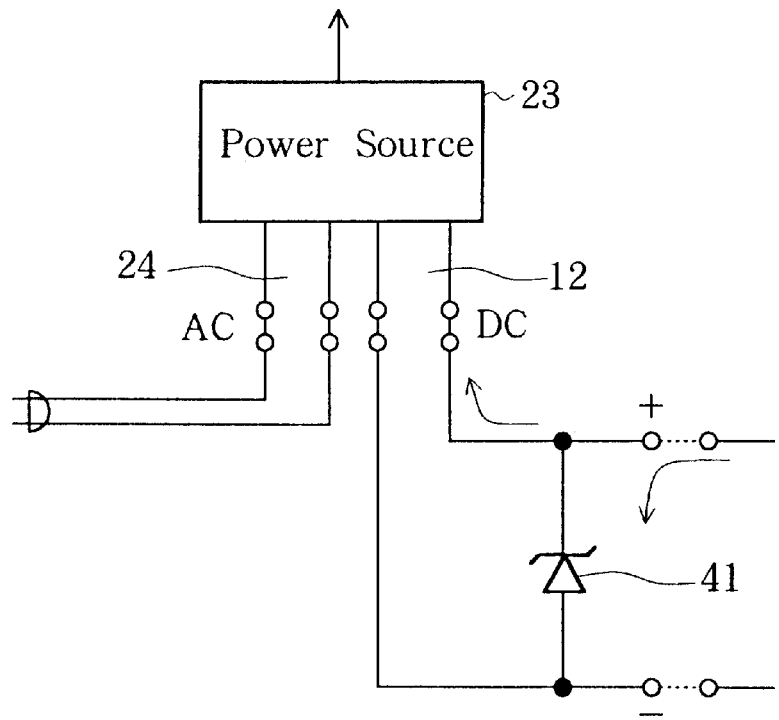

In the embodiment shown in FIG. 11, a constant voltage circuit 41 is connected between D.C. input terminals 20. Since a D.C. motor generator, a electric double layer capacitor and a polarity inverter circuit of the embodiment in FIG. 11 are the same as those of the embodiment shown in FIG. 9 or 10, they are not shown in FIG. 11. The constant voltage circuit 41 is a Zener diode practically. With the use of the constant voltage circuit 41, the voltage of the D.C. input terminals 20 can be maintained constant regardless of the rotation speed of the motor-generator. When the Zener diode is in a conduction state, current generated by the motor-generator (not shown) is branched to the Zener diode and the power source circuit 23 and an over current component is stored in the electric double layer capacitor 2.

Figure 12:
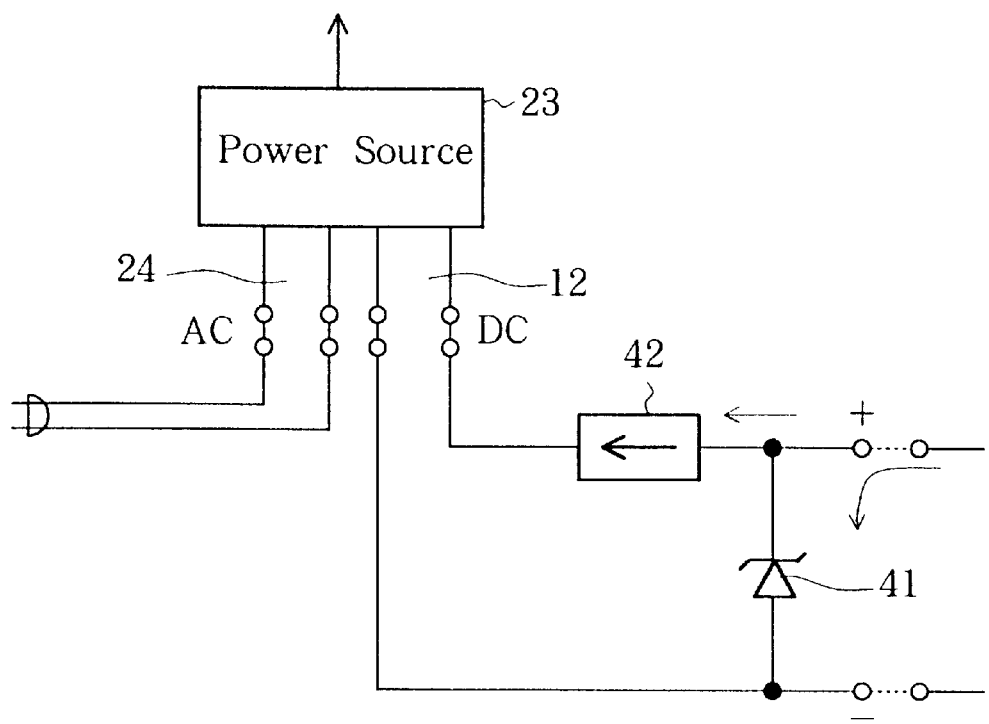

The embodiment shown in FIG. 12 differs from the circuit construction shown in FIG. 11 in that a constant current circuit 42 is inserted into a passage of the D.C. input terminals 20. With the constant current circuit 42, it is possible to supply current to a power source circuit 23 stably in a wide range of rotation speed of a motor generator (not shown), that is, from a very low rotation speed to a very high rotation speed.

Figure 13:
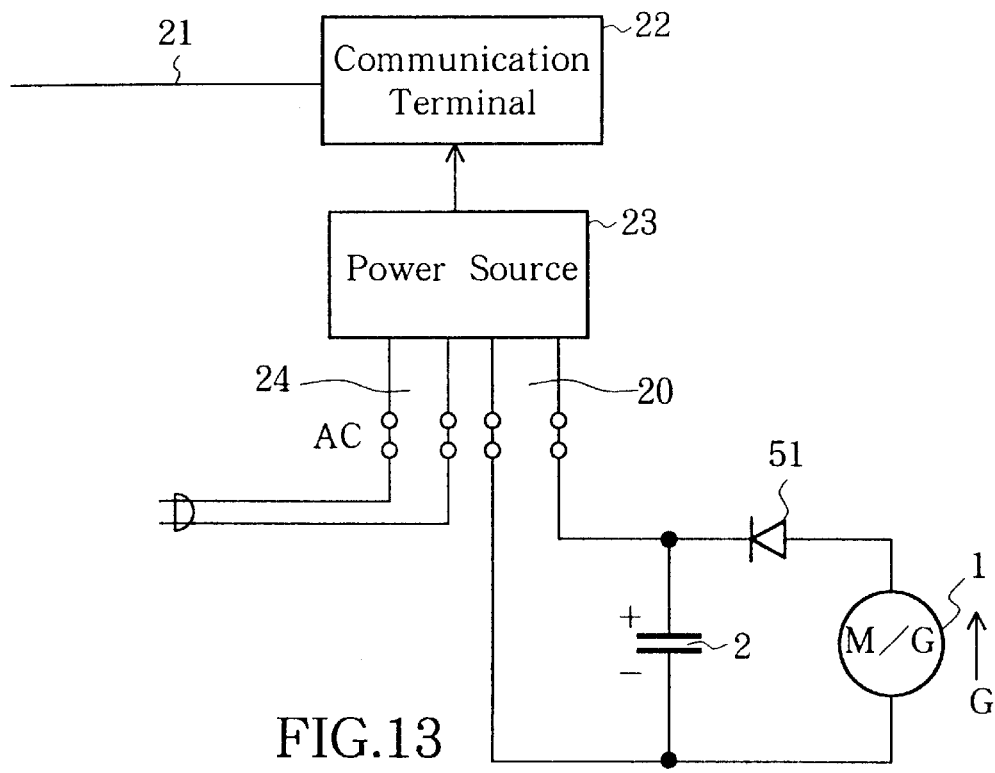
FIGS. 13 and 14 are block diagrams of other practical examples of the circuit construction, respectively.

FIG. 13 shows another embodiment of the power source circuit. This embodiment is a power source circuit 23 for supplying power source current to a communication terminal 22 housing an optical fiber 21 and includes a commercial power source terminals 24 used in a normal condition and D.C. input terminals 20 for use in an emergency state. An electric double layer capacitor 2 is connected to the D.C. input terminals 20 in parallel and a charging current is supplied from a D.C. motor-generator 1 through a rectifier 51 to the electric double layer capacitor 2. When the rotational driving of the D.C. motor-generator 1 is stopped, the rectifier 51 becomes non-conductive and current stored in the electric double layer capacitor 2 is supplied to the D.C. input terminals 20.

Figure 14:
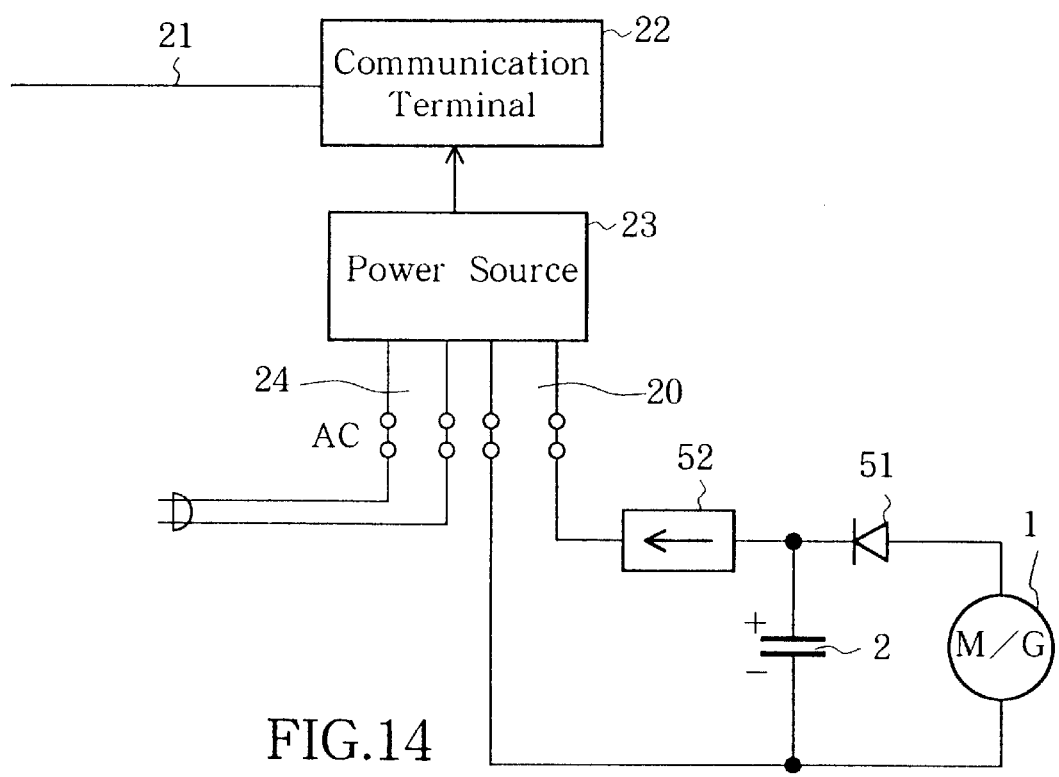

FIG. 14 shows a further embodiment of the power source circuit 23. The embodiment shown in FIG. 14 differs from the circuit shown in FIG. 13 in that a constant current circuit 52 is added to supply D.C. current of the power source circuit 23. With the provision of the constant current circuit 52, it is possible to maintain current supplied to the power source circuit 23 constant even if the terminal voltage of the electric double layer capacitor 2. Although the circuit construction shown in FIG. 14 is simple, it is effective as an emergency power source device of an optical fiber communication terminal.

The emergency power source devices of the optical fiber communication terminal shown in FIGS. 9 to 14 can maintain a communication for a very long time by intermittently charging the electric double layer capacitor in such a manner that the electric double layer capacitor 2 is charged by manually rotating the motor generator 1 for a start time of the communication, the manual rotation of the motor-generator 1 is stopped thereafter and the motor-generator 1 is rotated manually again when the charge in the electric double layer capacitor 1 becomes short.

As described hereinbefore, according to the power source device of the present invention, it is possible, by fixedly connecting the terminals of the D.C. motor-generator and the electric double layer capacitor directly through a pair of conductors, to store energy generated by a rotational force generated on a downhill or mechanical rotational force generated by a hand or foot as electric energy and utilize the stored electric energy as a mechanical rotation energy. Further, since the power source device does not require an inverter circuit and a control circuit for controlling the inverter circuit between the device for generating electric energy and the device for storing it, the construction thereof is simple and rigid and, therefore, it is possible to realize a reliable product with minimum accident. Such device can be applied to various machines such as electric car, electric bicycle, hybrid vehicle and the like as an electric fly-wheel.

Further, it is possible to easily provide an emergency power source device for supplying D.C. power source current to a D.C. power source circuit which can not use a commercial power source, by connecting the D.C. motor-generator and the electric double layer capacitor to D.C. input terminals of the D.C. power source circuit in series or in parallel. The power source device according to the present invention can be driven simply by such as man power. Further, in the power source device of the present invention which utilizes the electric double layer capacitor, it is not necessary to drive a generator throughout a period for which a communication is continued and, by driving the generator for a suitable time, for example, several minutes, it is possible to continue a communication for several tens minutes succeeding thereto. Therefore, it can be conveniently used as an emergency power source device. Since the present device utilizes the electric double layer capacitor, there is no periodical maintenance required and no frequent exchange of parts.

What is claimed is:

1. A motor-generator device comprising:
   a combination motor-generator, said motor-generator becoming a generator for generating D.C. current in a pair of terminals thereof in one current flow direction when a rotary shaft thereof is rotated in one rotational direction by an external force and becoming a motor for rotating said rotary shaft in the same one rotational direction when D.C. current is supplied to the pair of said terminals in a current flow direction opposite to the current flow direction of the D.C. current generated by said generator direction;
   an electric double layer capacitor for storing the D.C. current generated by said motor-generator operating as a generator and supplying the D.C. current to said D.C. motor-generator when said D.C. motor-generator is operating as a motor, the pair of said terminals of said motor-generator and terminals of said electric double layer capacitor being fixedly connected directly by a pair of conductors; and, mechanical means acting on said rotary shaft for permitting said rotary shaft to rotate only in said one rotational direction.

2. A motor-generator device as claimed in claim 1, further comprising a voltage limiter circuit operatively provided between the pair of said terminals.

3. A power source device comprising:

a D.C. power source circuit for converting a D.C. current input to D.C. input terminals into a predetermined D.C. power source output; and means for supplying a D.C. current to said D.C. input terminals of said D.C. power source circuit, wherein said supplying means comprises a D.C. generator for generating a D.C. current and an electric double layer capacitor for temporarily storing the D.C. current generated by said D.C. generator and supplying it to said D.C. input terminals of said D.C. power source circuit, said D.C. generator and said electric double layer capacitor being connected in series with said D.C. input terminals of said D.C. power source circuit;

a polarity inverter circuit connected to said D.C. input terminals of said D.C. power source circuit, for inverting the polarity of said electric double layer capacitor between a charging time and a discharging time, wherein said D.C. generator is a combination D.C. motor-generator, a flow direction of current generated by said D.C. motor-generator when said D.C. motor-generator operates as a generator being opposite to a flow direction of current supplied when said motor-generator operates as a motor, wherein a rotary shaft of said D.C. motor-generator rotates in the same one rotational direction when said D.C. motor generator operates as a generator as when said D.C. motor-generator operates as a motor; and further comprising mechanical means for forcibly preventing rotation of said rotary shaft in a direction opposite said one rotational direction.

4. A power source device as claimed in claim 3, further comprising a constant voltage circuit connected to said D.C. input terminals of said D.C. power source circuit.

5. A power source device as claimed in claim 3, further comprising a constant current circuit connected to said D.C. input terminals of said D.C. power source circuit.

6. A power source device comprising:

a D.C. power source circuit for converting a D.C. current input to D.C. input terminals of said D.C. power source circuit into a predetermined D.C. power source outptut; and means for supplying a D.C. current to said D.C. input terminals of said D.C. power source circuit, wherein said means for supplying comprises a D.C. generator for generating a D.C. current and an electric double layer capacitor for temporarily storing the D.C. current generated by said D.C. generator and supplying it to said D.C. input terminals, said D.C. generator and said electric double layer capacitor being connected in parallel to said D.C. input terminals of said D.C. power source circuit;

wherein said D.C. generator is a combination D.C. motor-generator, a flow direction of current generated by said D.C. motor-generator when said D.C. motor-generator operates as a generator being opposite to the flow direction of current supplied when said motor-generator operates as a motor, wherein a rotary shaft of said D.C. motor-generator rotates in the same one rotational direction when said D.C. motor generator operates as a generator as when said D.C. motor-generator operates as a motor; and further comprising mechanical means for preventing rotation of said rotary shaft in a direction opposite said one rotational direction.

7. A power source device as claimed in claim 6, further comprising a rectifier element provided between said D.C. generator and said electric double layer capacitor, for conducting D.C. current generated by said D.C. generator.

8. A power source device as claimed in claim 6, further comprising a constant current circuit connected to said D.C. input terminals of said D.C. power source circuit.

* * * * *